UNITED STATES PATENT OFFICE.

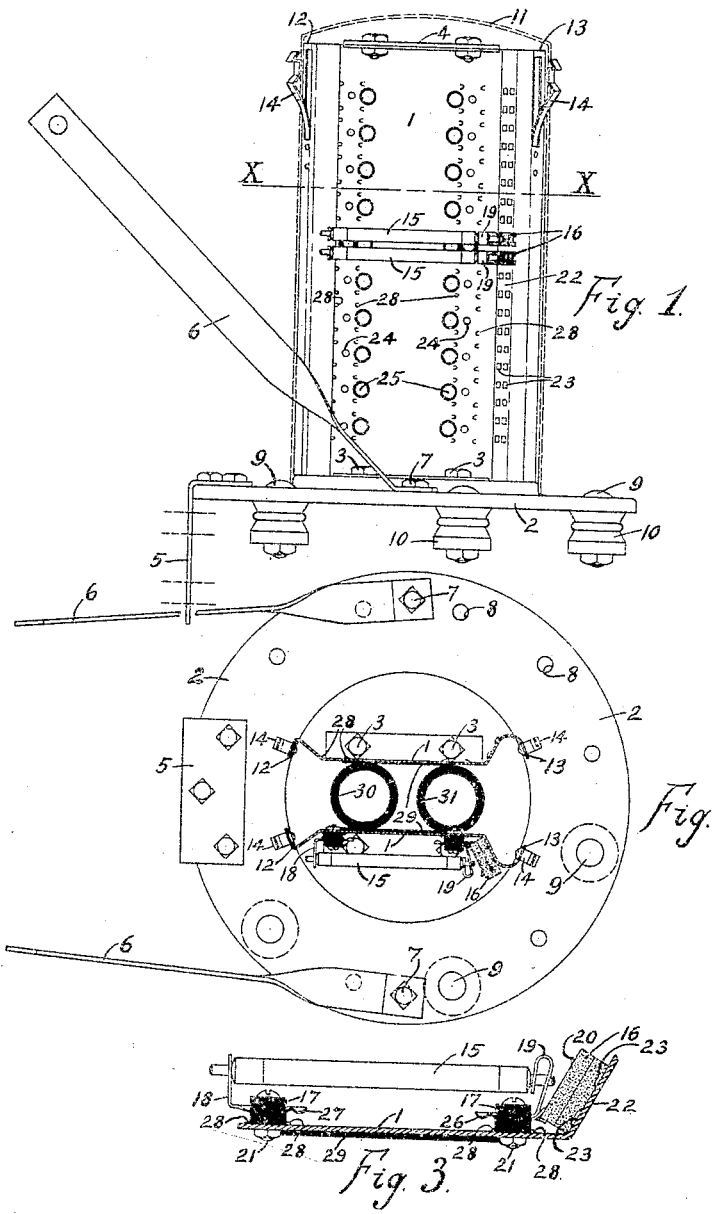

FRANK B. COOK, OF CHICAGO, ILLINOIS.

CABLE TERMINAL.

No. 862,543.  Specification of Letters Patent.  Patented Aug. 6, 1907.

Application filed May 28, 1906. Serial No. 319,135.

*To all whom it may concern:*

Be it known that I, FRANK B. COOK, a citizen of the United States of America, residing at Chicago, in the county of Cook and State of Illinois, have invented a new and useful Cable-Terminal, of which the following is a specification, reference being had to the accompanying drawings, illustrating same.

My invention relates to cable terminals, and more particularly to the open type of terminals.

The principal objects of my invention are to provide a cable terminal for pot-head use which is constructed entirely of sheet metal; to adapt such a terminal to accommodate individual protector units which may be mounted separately thereon at any time; to provide a distributing ring in connection with such a sheet metal terminal; to provide improved means for mounting such a terminal and distributing ring on the side of a pole; and to provide simplicity of construction, accessibility and durability in such a cable terminal.

Other objects will be apparent from the following specification.

In telephone or telegraph systems, or the like, where cables are used, it is customary to provide a terminal at each point where the cable conductors are distributed, through which the latter are connected, and to provide those terminals with protective devices to protect the cable conductors from injurious electricity which may come to the cable over the aerial conductors. The protective devices usually provided at such cable terminals are fuses and lightning arresters, to protect the cable from heavy currents and from high-voltage electricity, such as lightning. Occasionally very injurious currents of electricity of a high voltage will start a fire in such a terminal if the latter is constructed of combustible material, such as wood, which fire may burn out a considerable portion of the terminal and put the circuits passing through the terminal out of service.

My present invention provides a cable terminal which is made entirely of sheet metal, with the exception of a few small insulating parts, so as to eliminate the possibility of a fire occurring at the terminal under extremely dangerous electrical conditions, the sheet metal being formed and adapted to accommodate the protective devices which are mounted thereon, and to accommodate the cable conductors and aerial conductors leading to the terminal. Such a sheet metal terminal greatly simplifies the construction of such apparatus, as the sheet metal portions are formed and punched in presses, with few operations, thus doing away with the drilling, planing and grooving of wood parts. In the terminal of my present invention the sheet metal parts do not form an air-tight inclosed portion for the cable conductors, as provision is made for terminating the cable in a pot-head before it reaches the terminal and leading the weather-proof pot-head conductors to the terminal.

Referring to the accompanying drawings illustrating the preferred form of my invention, Figure 1 is a side elevation of the cable terminal of the invention; Fig. 2 is a cross-sectional view of Fig. 1 taken on line X X thereof, and Fig. 3 is a side elevation of an individual protector mount for the terminal of the invention.

Like characters refer to like parts in the several figures.

The individual protector mount of which Fig. 3 is a modification, forms the subject matter of my copending application Serial No. 356,881, filed February 11, 1907.

The terminal proper comprises the sheet-metal side pieces 1 1 which are punched and formed preferably as shown in the drawings to accommodate the individual protector mounts shown in Fig. 3. The sheet metal portions 1 1 are suitably mounted upon the circular distributing plate 2 by bolts 3 3. Through the central part of the distributing plate 2, between the sheet metal terminal portions 1 1, are provided insulating bushings 31 and 30 extending through the plate 2 to accommodate the cable conductors and the aerial conductors, respectively, leading to the terminal. All of the conductors leading to the terminal preferably come from beneath the distributing plate 2, so as not to interfere with the cover for the terminal. The cable leading to the bushing 31 is preferably pot-headed and the pot-head wires extended through the bushing 31 to the terminal. Across the top of the sheet metal portions 1 1 is secured a metal plate 4 adapted to firmly hold the portions 1 1 in place. On one side of the distributing plate 2 is provided a mounting bracket 5 which may be suitably mounted to the side of a pole. Braces 6 6 are preferably secured to opposite sides of the distributing plate 2 by bolts 7 7 and are adapted to be secured to the sides of the pole to firmly hold the plate 2 and terminal 1 in place. The distributing plate 2 is provided with holes 8 8 therearound through which bolts 9 9 extend to secure suitable insulators 10 10 to the underneath side of plate 2, preferably as shown. Insulators 10 10 are for supporting the drop conductors leading from the terminal. The edge portions 12 and 13 of terminal portions 1 1 are formed over as shown in Fig. 2 so that a sheet metal cover, shown in dotted lines at 11 in Fig. 1, may be slipped over the terminal, fitting the said edge portions 12 and 13 which serve as guides for the cover 11. The edge portions 12 and 13 are preferably provided with spring members 14 14 adapted to bear against the sheet metal cover 11 and firmly hold same in place whether the latter is pulled clear down over the terminal or partially raised.

Each individual protector mount comprises a pair of tubular fuses 15 15 and a pair of lightning arresters 16 16 suitably held in place by suitable spring members 18 19 and 20 which are mounted to insulating portions 17 17. Insulating portions 17 17 are suitably mounted to a sheet metal portion 1 of the terminal by bolts 21 21.

Spring members 18 19 and 20 are preferably convexly formed where they extend through the insulating portions 17 17, and extend through round holes in the latter. This reduces the leakage from one spring member to another to a minimum, for the reason that a very small portion of the surface of each spring member engages the material of the insulating portion 17. In a construction where flat metallic members are held in slots in the insulating portions, there is considerable surface leakage due to the fact that a large amount of the surface of each conducting member engages the insulating portion. Lightning arresters 16 16 are held in place between spring members 20 20 and the bent-up portion 22 of portion 1, and by projections 23 23 formed out of the portion 22 to firmly hold the lightning arresters 16 16 in place against lateral displacement. Each side portion 1 is provided with holes 24 24 adapted to accommodate mounting bolts 21 21 of the protectors; with holes 25 25 adapted to accommodate electrical conductors leading from terminals 26 26 to the cable conductors and from terminals 27 27 to the bridle wires extending to the line conductors; and with rows of projecting points 28 28 28 28 adapted to hold the insulating mounting portions 17 17 against displacement. On the inside of each portion 1 of the terminal is provided a strip of insulation 29 which is provided with holes therein to coincide with holes 25 25 in portion 1 but somewhat smaller than the latter so as to insulate the electrical conductors extending through the metallic plate 1 therefrom.

The pairs of protectors of Fig. 3 may be mounted upon the side portions 1 1 of the terminal as desired, either before or after the terminal is installed; or the insulating portions 17 17 carrying spring members 19 and 20 may be mounted on the sheet metal portions 1 1 when the cable terminal is installed and the cable conductors distributed and soldered to the terminals 26 26, and the other insulating portions 17 17 carrying spring members 18 18 may be mounted on the sheet metal portions 1 1 when it is desired to mount the fuses 15 15 in place. Insulators 10 10, from which the drop wires lead, may be mounted to the distributing plate 2 at any time, either before or after the terminal is installed.

I do not wish to limit this invention to the exact details of construction as herein shown, as many changes may be made therein without departing from the invention.

What I claim as my invention and desire to secure by Letters Patent, is:

1. A cable terminal of the character described comprising a pair of substantially flat sheet metal protector mounting strips mounted vertically on a suitable base with space between throughout their extent and formed to accommodate electrical protective apparatus, suitable protective apparatus mounted on the said mounting strips, means for accommodating conductors leading to the terminal, means for distributing the conductors through the said mounting strips to the protective apparatus, and a sheet metal cover for the whole placed over the terminal and inclosing same.

2. A cable terminal comprising a suitable base, a plurality of substantially flat sheet metal protector mounting strips mounted vertically on the said base and formed to accommodate protective apparatus, suitable protective apparatus mounted on the said strips, a strip of insulating material for each of the said sheet metal strips and secured against same, a series of holes through the said sheet metal strips and strips of insulating material for accommodating conductors leading to the protective apparatus, the holes in the strips of insulating material being concentric with and smaller than the holes in the sheet metal strips whereby the said conductors are kept out of contact with the said sheet metal strips.

3. A cable terminal of the character described comprising a suitable mounting base, a pair of substantially flat sheet metal protector mounting strips mounted parallel and vertical on the said base and having the vertical edge portions thereof formed at angles with the body of the said strips, a cylindrical sheet metal cover placed over the terminal, and spring members carried by the said formed vertical edge portions and adapted to bear out against the said cover to hold same in place in any desirable position.

4. A cable terminal comprising a suitable base, sheet-metal side portions mounted vertically on the said base and formed to accommodate protective apparatus, suitable protective apparatus mounted on the said side portions, series of holes through the sheet-metal side portions to accommodate electrical conductors leading to the protective apparatus, and suitable formations on the sheet-metal portions to hold the protective apparatus in place.

5. A cable terminal comprising a pair of substantially flat sheet metal side portions suitably formed to accommodate protective apparatus, a plate upon which the side portions are vertically mounted so as to provide space therebetween throughout their extent, insulating bushings extending through the central portion of the plate between the side portions to accommodate conductors leading to the terminal, suitable protective apparatus mounted on the exterior surfaces of the side portions, and suitable holes through the side portions to accommodate conductors leading therethrough to the protective apparatus.

6. A cable terminal comprising a suitable mounting base, a plurality of substantially flat sheet metal protector mounting strips mounted vertically on the said base, series of insulating portions carrying spring members and mounted on the said strips, series of fuses carried by the said spring members, formed portions on the said strips, series of lightning arresters mounted between certain of the spring members and the said formed portions, and holes through the said strips to accommodate electrical conductors leading to the fuses and lightning arresters.

7. A cable terminal comprising a suitable mounting base, sheet metal protector mounting strips mounted on the said base and formed to accommodate protective apparatus, insulating portions carrying spring members and suitably mounted to the said strips fuses suitably held in place by certain of the spring members, formed portions on the said strips, lightning arresters inserted between certain of the spring members and the said formed portions of the said strips, series of projecting portions on the said strips adapted to hold the lightning arresters against lateral displacement, and other series of projecting portions on the said strips adapted to hold the said insulating portions in alinement.

8. A cable terminal comprising parallel sheet metal side portions suitably formed to accommodate protective apparatus, a circular sheet metal mounting plate therefor, insulating bushings extending through the central portion of the mounting plate between the sheet metal side portions to accommodate the conductors leading to the terminal, suitable protective apparatus to be mounted on the said sheet metal portions, a bracket for mounting the said mounting plate to the side of a pole, suitable braces secured to opposite sides of the said mounting plate and adapted to be secured to the pole, a series of insulators suitably mounted to the underneath side of the said mounting plate around the edge thereof, and a sheet metal cover inclosing the said sheet metal side portions of the terminal and resting on the said mounting plate.

As inventor of the foregoing I hereunto subscribe my name in the presence of two subscribing witnesses, this 22nd day of May, 1906.

FRANK B. COOK.

Witnesses:
 FREDERICK R. PARKER,
 F. W. PARDEE.